United States Patent
Zhu et al.

(10) Patent No.: US 12,430,564 B2
(45) Date of Patent: Sep. 30, 2025

(54) FINE-TUNING POLICIES TO FACILITATE CHAINING

(71) Applicant: NVIDIA Corporation, Santa Clara, CA (US)

(72) Inventors: Yuke Zhu, Austin, TX (US); Anima Anandkumar, Pasadena, CA (US); Youngwoon Lee, Los Angeles, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 884 days.

(21) Appl. No.: 17/684,245

(22) Filed: Mar. 1, 2022

(65) Prior Publication Data

US 2023/0280726 A1 Sep. 7, 2023

(51) Int. Cl.
*G06N 3/092* (2023.01)
*G05B 19/418* (2006.01)

(52) U.S. Cl.
CPC ........ *G06N 3/092* (2023.01); *G05B 19/41865* (2013.01); *G05B 19/41885* (2013.01); *G05B 19/41895* (2013.01)

(58) Field of Classification Search
CPC ........ G05B 19/41865; G05B 19/41885; G05B 19/41895; G06N 3/092
See application file for complete search history.

(56) References Cited

U.S. PATENT DOCUMENTS

| | | | | |
|---|---|---|---|---|
| 11,157,010 | B1 * | 10/2021 | Narang | G06N 20/00 |
| 11,657,266 | B2 * | 5/2023 | Yang | G06N 3/006 |
| | | | | 706/10 |
| 12,154,029 | B2 * | 11/2024 | Schaul | G06N 3/08 |
| 2018/0165603 | A1 * | 6/2018 | Van Seijen | G06N 3/045 |
| 2018/0218267 | A1 * | 8/2018 | Halim | G06N 7/01 |
| 2020/0334565 | A1 * | 10/2020 | Tresp | G06N 3/006 |
| 2021/0341904 | A1 * | 11/2021 | Woehlke | G05D 1/0221 |
| 2022/0245503 | A1 * | 8/2022 | Li | G06N 5/01 |

OTHER PUBLICATIONS

W. Han, S. Levine, and P. Abbeel. "Learning compound multi-step controllers under unknown dynamics". In: 2015 IEEE/RSJ International Conference on Intelligent Robots and Systems (IROS). IEEE. 2015, pp. 6435-6442 (Year: 2015).*
Zhu et al., "Reinforcement and Imitation Learning for Diverse Visuomotor Skills," Robotics: Science and Systems, 2018, 10 pages, retrieved http://www.roboticsproceedings.org/rss14/p09.pdf.

(Continued)

*Primary Examiner* — Jacob D Dascomb
(74) *Attorney, Agent, or Firm* — Zilka-Kotab, P.C.

(57) ABSTRACT

A manipulation task may include operations performed by one or more manipulation entities on one or more objects. This manipulation task may be broken down into a plurality of sequential sub-tasks (policies). These policies may be fine-tuned so that a terminal state distribution of a given policy matches an initial state distribution of another policy that immediately follows the given policy within the plurality of policies. The fine-tuned plurality of policies may then be chained together and implemented within a manipulation environment.

19 Claims, 5 Drawing Sheets

(56) References Cited

OTHER PUBLICATIONS

Peng et al., "AMP: Adversarial Motion Priors for Stylized Physics-Based Character Control," ACM Transactions on Graphics, vol. 40, No. 4, Aug. 2021, pp. 1:1-1:20.
Schulman et al., "Proximal Policy Optimization Algorithms," arXiv, 2017, 12 pages, retrieved from https://arxiv.org/pdf/1707.06347.pdf.
Pertsch et al., "Accelerating Reinforcement Learning with Learned Skill Priors," 4th Conference on Robot Learning (CoRL), 2020, pp. 1-17.
Sutton, R., "Temporal Credit Assignment in Reinforcement Learning," PhD thesis, University of Massachusetts, Feb. 1984, 223 pages.
Levine et al., "End-to-End Training of Deep Visuomotor Policies," Journal of Machine Learning Research, vol. 17, 2016, pp. 1-40.
Suarez-Ruiz et al., "A Framework for Fine Robotic Assembly," IEEE International Conference on Robotics and Automation (ICRA), 2016, 8 pages, retrieved from https://www.semanticscholar.org/paper/A-framework-for-fine-robotic-assembly-Suarez-Ruiz-Pham/d2ae6a833c514fe2dc1f61967580575519ba1235.
Rajeswaran et al., "Learning Complex Dexterous Manipulation with Deep Reinforcement Learning and Demonstrations," Robotics: Science and Systems (RSS), 2018, 9 pages, retrieved from https://arxiv.org/abs/1709.10087.
Jain et al., "Learning Deep Visuomotor Policies for Dexterous Hand Manipulation," International Conference on Robotics and Automation (ICRA), 2019, 7 pages, retrieved from https://www.semanticscholar.org/paper/Learning-Deep-Visuomotor-Policies-for-Dexterous-Jain-Li/6b0d807e205cf26c3fc0d378942ab60ea50e5513.
Andrychowicz et al., "What Matters for On-Policy Deep Actor-Critic Methods? A Large-Scale Study," ICLR, 2021, pp. 1-10.
Clegg et al., "Learning to Dress: Synthesizing Human Dressing Motion via Deep Reinforcement Learning," ACM Transactions on Graphics, vol. 37, No. 6, Nov. 2018, pp. 179:1-179:10.
Lee et al., "Composing Complex Skills by Learning Transition Policies," International Conference on Learning Representations, 2019, pp. 1-19.
Peng et al., "MCP: Learning Composable Hierarchical Control with Multiplicative Compositional Policies," 33rd Conference on Neural Information Processing Systems (NeurIPS), 2019, pp. 1-12.
Lee et al., "Learning to Coordinate Manipulation Skills via Skill Behavior Diversification," ICLR, 2020, pp. 1-15.
Ghosh et al., "Divide-and-Conquer Reinforcement Learning," ICLR, 2018, pp. 1-14.
Konidaris et al., "Skill Discovery in Continuous Reinforcement Learning Domains using Skill Chaining," Proceedings of the 22nd International Conference on Neural Information Processing Systems, Dec. 2009, 9 pages, retrieved from https://proceedings.neurips.cc/paper/2009/file/7bcdf75ad237b8e02e301f4091fb6bc8-Paper.pdf.
Bagaria et al., "Option discovery using deep skill chaining," ICLR, 2020, pp. 1-21.
Pastor et al., "Learning and Generalization of Motor Skills by Learning from Demonstration,"—IEEE International Conference on Robotics and Automation, May 2009, 7 pages.
Kober et al., "Movement Templates for Learning of Hitting and Batting," Proceedings—IEEE International Conference on Robotics and Automation, May 2010, 7 pages.
Muelling et al., "Learning to Select and Generalize Striking Movements in Robot Table Tennis," AAAI Technical Report FS-12-07, Robots Learning Interactively from Human Teachers, 8 pages.
Hausmann et al., "Learning an Embedding Space for Transferable Robot Skills," ICLR, 2018, pp. 1-16.
Lee et al., "Ikea Furniture Assembly Environment for Long-Horizon Complex Manipulation Tasks," IEEE International Conference on Robotics and Automation, 2021, 7 pages, retrieved from https://clvrai.com/assets/research/lee_icra21.pdf.
Lillicrap et al., "Continuous Control with Deep Reinforcement Learning," ICLR, 2016, pp. 1-14.
Schulman et al., "Trust Region Policy Optimization," Proceedings of the 31st International Conference on Machine Learning, 2015, 9 pages.
Haarnoja et al., "Soft Actor-Critic: Off-Policy Maximum Entropy Deep Reinforcement Learning with a Stochastic Actor," Proceedings of the 35 th International Conference on Machine Learning, 2018, 10 pages.
Riedmiller et al., "Learning by Playing—Solving Sparse Reward Tasks from Scratch," arXiv, 2018, 18 pages, retrieved from https://arxiv.org/pdf/1802.10567.pdf.
Pomerleau, D., "Alvinn: An Autonomous Land Vehicle in a Neural Network," Advances in Neural Information Processing Systems, 1988, pp. 305-313, retrieved from https://proceedings.neurips.cc/paper/1988/file/812b4ba287f5ee0bc9d43bbf5bbe87fb-Paper.pdf.
Schaal et al., "Learning From Demonstration," Advances in Neural Information Processing Systems, 1996, pp. 1040-1046.
Finn et al., "Deep Spatial Autoencoders for Visuomotor Learning," IEEE International Conference on Robotics and Automation, 2016, 9 pages, retrieved https://arxiv.org/abs/1509.06113.
Pathak et al., "Zero-Shot Visual Imitation," International Conference on Learning Representations, 2018, pp. 1-16.
Ng et al., "Algorithms for Inverse Reinforcement Learning," International Conference on Machine Learning, 2000, pp. 1-8.
Abbeel et al., "Apprenticeship Learning via Inverse Reinforcement Learning," Proceedings of the 21 st International Conference on Machine Learning, 2004, 8 pages.
Ziebart et al., "Maximum Entropy Inverse Reinforcement Learning," AAAI Conference on Artificial Intelligence, 2008, 6 pages, retrieved from http://www.cs.cmu.edu/~bziebart/publications/maximum-entropy-inverse-reinforcement-learning.html.
Ho et al., "Generative Adversarial Imitation Learning," 30th Conference on Neural Information Processing Systems, 2016, pp. 1-9.
Fu et al., "Learning robust rewards with adversarial inverse reinforcement learning," International Conference on Learning Representations, 2018, pp. 1-15.
Kostrikov et al., "Discriminator-Actor-Critic: Addressing Sample Inefficiency and Reward Bias in Adversarial Imitation Learning," International Conference on Learning Representations, 2019, pp. 1-15.
Zolna et al., "Task-Relevant Adversarial Imitation Learning," 4th Conference on Robot Learning, 2020, pp. 1-17.
Sutton et al., "Between MDPs and semi-MDPs: A framework for temporal abstraction in reinforcement learning," Artificial Intelligence, vol. 112, 1999, pp. 181-211.
Schmidhuber, J., "Towards Compositional Learning in Dynamic Networks," TUM, Institut fur Informatik, 1990, 11 pages.
Bacon et al., "The Option-Critic Architecture," Proceedings of the Thirty-First AAAI Conference on Artificial Intelligence, 2017, pp. 1726-1734.
Nachum et al., "Data-Efficient Hierarchical Reinforcement Learning," 32nd Conference on Neural Information Processing Systems, 2018, pp. 1-11.
Levy et al., "Learning Multi-Level Hierarchies with Hindsight," International Conference on Learning Representations, 2019, pp. 1-16.
Konidaris et al., "Robot Learning from Demonstration by Constructing Skill Trees," The International Journal of Robotics Research, May 2012, pp. 1-33.
Kipf et al., "CompILE: Compositional Imitation Learning and Execution," Proceedings of the 36 th International Conference on Machine Learning, 2019, pp. 1-11.
Lu et al., "Learning Task Decomposition with Ordered Memory Policy Network," International Conference on Learning Representations, 2021, pp. 1-21.
Frans et al., "Meta Learning Shared Hierarchies," International Conference on Learning Representations, 2018, pp. 1-11.
Kulkarni et al., "Hierarchical Deep Reinforcement Learning: Integrating Temporal Abstraction and Intrinsic Motivation," 30th Conference on Neural Information Processing Systems, 2016, pp. 1-9.
Oh et al., "Zero-Shot Task Generalization with Multi-Task Deep Reinforcement Learning," Proceedings of the 34 th International Conference on Machine Learning, 2017, 10 pages.

(56) References Cited

OTHER PUBLICATIONS

Merel et al., "Hierarchical Visuomotor Control of Humanoids," International Conference on Learning Representations, 2019, pp. 1-19.
Andreas et al., "Modular Multitask Reinforcement Learning with Policy Sketches," International Conference on Machine Learning, 2017, pp. 1-12.
Kase et al., "Transferable Task Execution from Pixels through Deep Planning Domain Learning," IEEE International Conference on Robotics and Automation, 2020, 7 pages, retrieved from https://www.semanticscholar.org/paper/Transferable-Task-Execution-from-Pixels-through-Kase-Paxton/b3deae9eb5e15d70b581561b5246bfd522abe853.
Driess et al., "Learning Geometric Reasoning and Control for Long-Horizon Tasks from Visual Input," IEEE Iternational Conference on Robotics and Automation, May 2021, 9 pages.
Niekum et al., "Incremental Semantically Grounded Learning from Demonstration," Robotics: Science and Systems, 2013, 8 pages, retrieved from http://www.roboticsproceedings.org/rss09/p48.pdf.
Knepper et al., "IkeaBot: An Autonomous Multi-Robot Coordinated Furniture Assembly System," IEEE International Conference on Robotics and Automation, May 2013, pp. 855-862.
Suarez-Ruiz et al., "Can robots assemble an Ikea chair?" Science Robotics, Apr. 2018, pp. 1-8.

\* cited by examiner

FINE-TUNING POLICIES TO FACILITATE CHAINING

FIELD OF THE INVENTION

The present disclosure relates to implementing manipulation tasks within a manipulation environment.

BACKGROUND

Long-horizon manipulation tasks include multiple sub-steps (such as multi-step object assembly or complicated device operation). Due to the high complexity of required skills and the long horizon of the tasks, existing reinforcement learning and imitation learning approaches struggle at solving these tasks. Skill chaining is a promising approach for synthesizing complex behaviors by sequentially combining previously learned skills. However, a naive composition of skills fails when a policy encounters a starting state never seen during its training, and prior solutions to this problem widen the starting state distributions of policies, which requires coverage for larger state distributions as additional policies are sequenced, which limits this solution to short skill sequences. It is therefore desirable to create an improved policy sequencing implementation that avoids the above problems.

DETAILED DESCRIPTION

A manipulation task may include operations performed by one or more manipulation entities on one or more objects. This manipulation task may be broken down into a plurality of sequential sub-tasks (policies). These policies may be fine-tuned so that a terminal state distribution of a given policy matches an initial state distribution of another policy that immediately follows the given policy within the plurality of policies. The fine-tuned plurality of policies may then be chained together and implemented within a manipulation environment.

Figure 1:
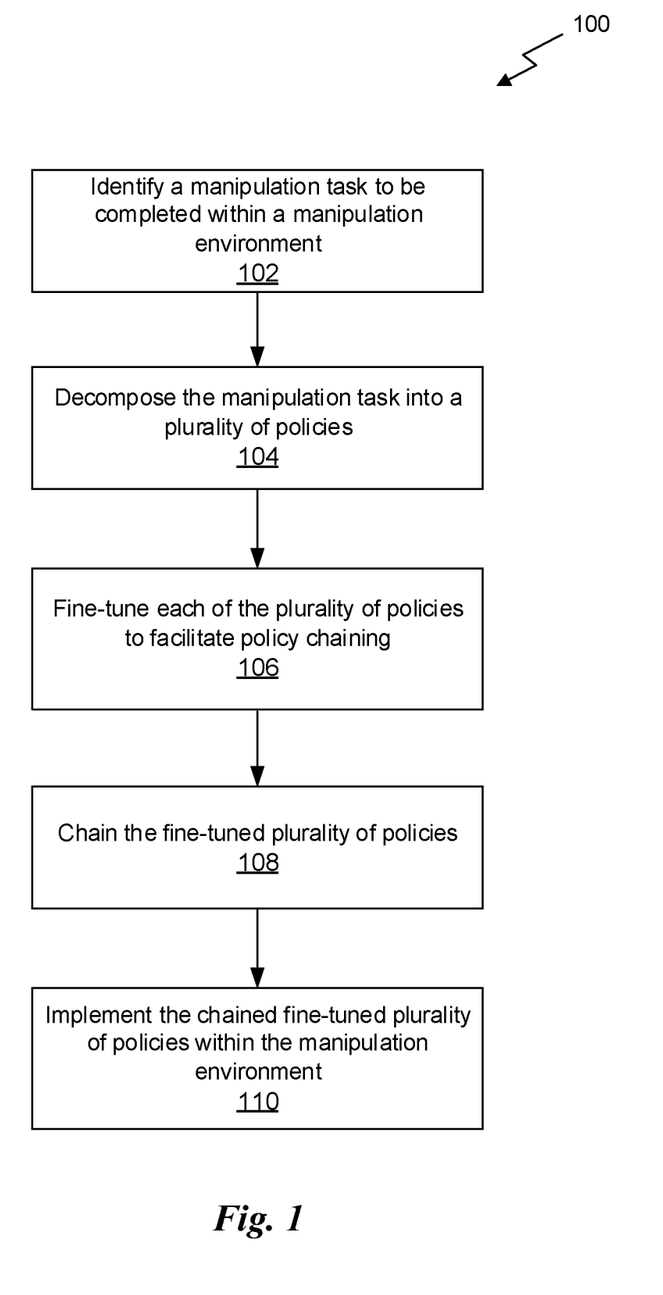
FIG. 1 illustrates a flowchart of a method of fine-tuning policies to facilitate chaining, in accordance with an embodiment.

FIG. 1 illustrates a flowchart of a method 100 of fine-tuning policies to facilitate chaining, in accordance with an embodiment. The method 100 may be performed the context of a processing unit and/or by a program, custom circuitry, or by a combination of custom circuitry and a program. For example, the method 100 may be executed by a GPU (graphics processing unit), CPU (central processing unit), or any processor described below. Furthermore, persons of ordinary skill in the art will understand that any system that performs method 100 is within the scope and spirit of embodiments of the present disclosure.

As shown in operation 102, a manipulation task to be completed within a manipulation environment is identified.

In one embodiment, the manipulation task may include a plurality of steps. For example, the manipulation task may include the assembly of one or more objects from a plurality of parts. In another example, the manipulation task may include one or more automated driving operations (e.g., the controlling of a vehicle to perform one or more maneuvers, etc.).

Additionally, in one embodiment, the manipulation task may include operations performed by one or more manipulation entities on one or more objects. For example, the manipulation entities may include one or more robotic manipulation devices (e.g., a robotic arm, etc.). In another example, the manipulation entities may include one or more vehicle manipulation devices (e.g., one or more servos, actuators, etc.). In yet another example, the objects may include one or more components of a product being assembled, altered, etc. In still another example, the objects may include one or more components of a vehicle being controlled.

Further, in one embodiment, the manipulation task may include a long-horizon manipulation task (e.g., a task including multiple sub-skills/steps). In another embodiment, the manipulation environment may include a manufacturing environment including a plurality of robotic manipulators, a vehicle environment including a plurality of vehicle manipulation devices, etc.

Further still, as shown in operation 104, the manipulation task is decomposed into a plurality of policies. In one embodiment, the manipulation task may be analyzed to identify a plurality of steps performed during the manipulation task. For example, the steps may include sequential steps performed during the manipulation task. In another embodiment, the plurality of policies may be ordered in a sequential manner (e.g., to create a sequence of policies). For example, a first task may be identified as being performed immediately before a second task. In another example, the first task may be labelled as a first policy, and the second task may be labelled as a second policy.

Also, in one embodiment, each of the plurality of policies may identify one or more manipulations performed by one or more manipulation entities on one or more objects. In another embodiment, each of the plurality of policies may have an associated initial state distribution. For example, an initial state distribution of a policy may identify all possible states of the manipulation entities and the objects being manipulated immediately before the policy is implemented.

In addition, in one embodiment, each of the plurality of policies may have an associated terminal state distribution. For example, a terminal state distribution of a policy may identify all possible states of the manipulation entities and the objects being manipulated immediately after the policy is implemented. In another embodiment, the states of the manipulation entities may include a location of the manipulation entities, an orientation of the manipulation entities, a power state of the manipulation entities, etc. In yet another embodiment, the states of the objects may include a location of the objects, an orientation of the objects, etc.

Furthermore, as shown in operation 106, each of the plurality of policies is fine-tuned to facilitate policy chaining. In one embodiment, fine-tuning a policy may include adjusting one or more manipulations performed by one or more manipulation entities on one or more objects within the policy. In another embodiment, one or more manipulations may be adjusted to change the terminal state distribution such that the terminal state distribution matches an initial state distribution of a subsequent policy within the sequence of policies.

For example, a first policy may be identified that is performed immediately before a second policy within the sequence of policies. In another example, an initial state distribution of the second policy may be determined. In yet another example, the first policy may be adjusted so that a terminal state distribution of the first policy matches the initial state distribution of the second policy (or is within a predetermined threshold of the initial state distribution of the second policy). In still another example, the second policy may be adjusted so that the initial state distribution of the second policy matches the terminal state distribution of the first policy (or is within a predetermined threshold of the terminal state distribution of the first policy). For instance, both the first policy and the second policy may be adjusted simultaneously.

In another example, a difference between the terminal state distribution of the first policy (e.g., all possible states of the manipulation entities and the objects being manipulated immediately after the first policy is implemented) and the initial state distribution of the second policy (e.g., all possible states of the manipulation entities and the objects being manipulated immediately before the policy is implemented) may be determined. In yet another example, if the difference is greater than a predetermined threshold, additional adjusting of the one or more manipulations performed by one or more manipulation entities on one or more objects within the first policy may be performed (e.g., until the difference is less than a predetermined threshold). In still another example, if the difference is less than a predetermined threshold, adjusting may be stopped and fine-tuning for the first policy may be determined to be complete.

Further still, in one embodiment, the fine-tuning may be performed within a simulation environment. For example, the simulation environment may include a physics simulator. In another embodiment, the simulation environment may implement reinforcement learning during the fine-tuning. For example, as one or more manipulations are adjusted for a policy within the simulation environment, reinforcement learning may be applied to these adjusted actions to determine an updated feature state of the manipulation environment. In another example, the updated feature state may include current states of the manipulation entities and the objects being manipulated in response to a manipulation. In yet another example, the updated feature state may then be analyzed to determine additional manipulations necessary to achieve a desired terminal state distribution for the policy.

Also, in one embodiment, the fine-tuning may be performed within a tangible/physical (e.g., non-simulated) environment. For example, one or more manipulations physically performed by one or more manipulation entities on one or more objects within the policy may be adjusted in real-time. In another example, feedback from these adjustments may be obtained and used to further adjust the manipulation entities to achieve a desired terminal state distribution for the policy.

Additionally, as shown in operation 108, the fine-tuned plurality of policies is chained. In one embodiment, chaining the fine-tuned plurality of policies may include initiating a first policy of the fine-tuned plurality of policies, and initiating additional policies in response to a completion of previous policy such that the fine-tuned plurality of policies is sequentially implemented. In another embodiment, the chained fine-tuned plurality of policies may be deployed within the manipulation environment. In yet another embodiment, the chained fine-tuned plurality of policies may be implemented by the one or more manipulation entities on one or more objects to perform the manipulation task.

Further, as shown in operation 110, the chained fine-tuned plurality of policies is implemented within the manipulation environment. In one embodiment, the chained fine-tuned plurality of policies may be deployed within the manipulation environment. In another embodiment, the chained fine-tuned plurality of policies may be implemented by the one or more manipulation entities on one or more objects to perform the manipulation task.

In this way, state distributions of adjacent policies within a manipulation task may be dynamically adjusted to match each other instead of increasing the state distributions for those policies. This may reduce an amount of data to be stored and analyzed during a chaining/sequencing of policies, which may improve a performance of computing hardware performing the analysis/chaining. Additionally, this matching may also avoid policy failure resulting from an unknown initial state, which may improve a performance of hardware implementing the policies.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2:
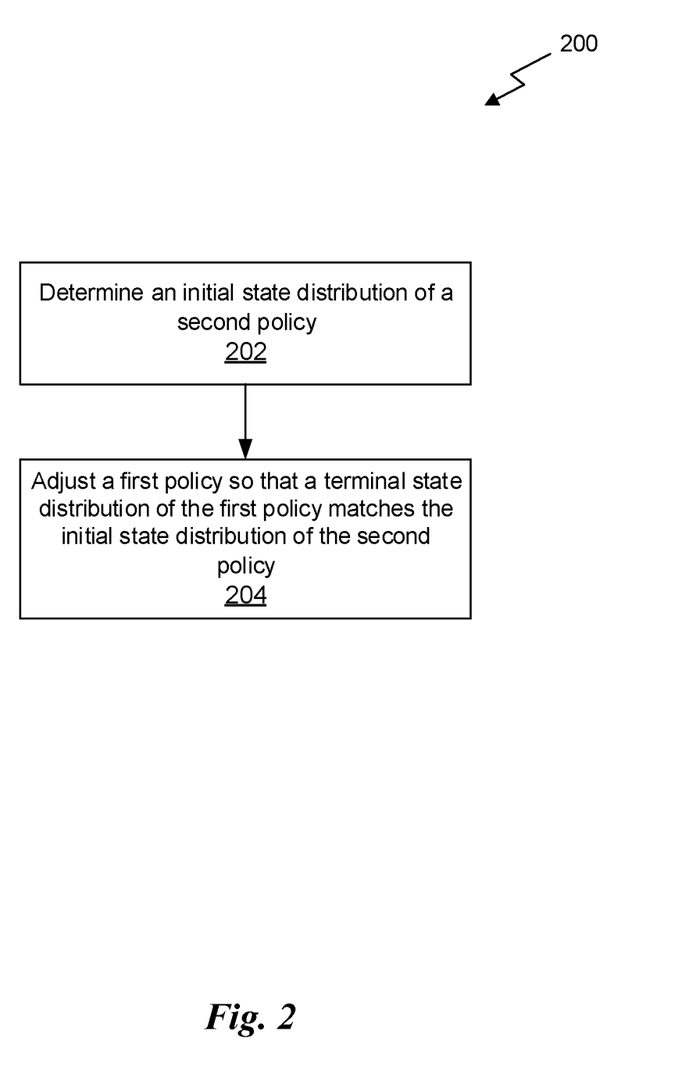
FIG. 2 illustrates a flowchart of a method of performing a policy adjustment, in accordance with an embodiment.

FIG. 2 illustrates a flowchart of a method 200 of performing a policy adjustment, in accordance with an embodiment. The method 200 may be performed the context of a processing unit and/or by a program, custom circuitry, or by a combination of custom circuitry and a program. For example, the method 200 may be executed by a GPU (graphics processing unit), CPU (central processing unit), or any processor described below. Furthermore, persons of ordinary skill in the art will understand that any system that performs method 200 is within the scope and spirit of embodiments of the present disclosure.

As shown in operation 202, an initial state distribution of a second policy is determined. In one embodiment, the second policy may describe one or more manipulations performed by one or more manipulation entities on one or more objects. In another embodiment, the manipulation entities may include one or more robotic manipulation devices. In yet another embodiment, the manipulation entities may include one or more vehicle manipulation devices.

Additionally, in one embodiment, the objects may include one or more components of a product being assembled, altered, etc. In another embodiment, the objects may include one or more components of a vehicle being controlled. In yet another embodiment, the initial state distribution of the second policy may identify all possible states of the manipulation entities and the objects being manipulated immediately before the second policy is implemented.

Further, as shown in operation 204, a first policy is adjusted so that a terminal state distribution of the first policy matches the initial state distribution of the second policy. In one embodiment, the first policy may also describe one or more manipulations performed by the one or more manipulation entities on the one or more objects. In another embodiment, the terminal state distribution of the first policy may identify all possible states of the manipulation entities and the objects being manipulated immediately after the first policy is implemented.

Further still, in one embodiment, the first policy may be adjusted so that the terminal state distribution of the first policy is within a predetermined threshold of the initial state distribution of the second policy. In another embodiment, a difference between the terminal state distribution of the first policy and the initial state distribution of the second policy may be determined. In yet another embodiment, if the difference is greater than a predetermined threshold, additional adjusting of the one or more manipulations performed by one or more manipulation entities on one or more objects within the first policy may be performed until the difference is less than a predetermined threshold. In still another embodiment, if the difference is less than a predetermined threshold, adjusting may be stopped and fine-tuning for the first policy may be determined to be complete.

Also, in one embodiment, the fine-tuning may be performed within a simulation environment. In another embodiment, the fine-tuning may be performed within a physical environment. In yet another embodiment, the adjusted first policy may be chained to the second policy such that upon implementation the adjusted first policy is implemented immediately before the second policy.

In addition, in one embodiment, the chained policies may be implemented within a manipulation environment. For example, implementing the chained policies may include first performing the manipulations indicated by the first policy, and then performing the manipulations indicated by the second policy in response to a completion of the manipulations indicated by the first policy. In another embodiment, the manipulation environment may include a manufacturing environment, a vehicle environment, etc.

In this way, the terminal state distribution of the first policy may be dynamically adjusted to match the initial state distribution of the second policy instead of increasing the terminal state distribution for the first policy. This may reduce an amount of data to be stored and analyzed during a chaining/sequencing of the first and second policies, which may improve a performance of computing hardware performing the analysis/chaining. Additionally, this matching may also avoid a failure of the second policy resulting from an unknown initial state created in response to the implementation of the first policy, which may improve a performance of hardware implementing the first and second policies.

Figure 3:
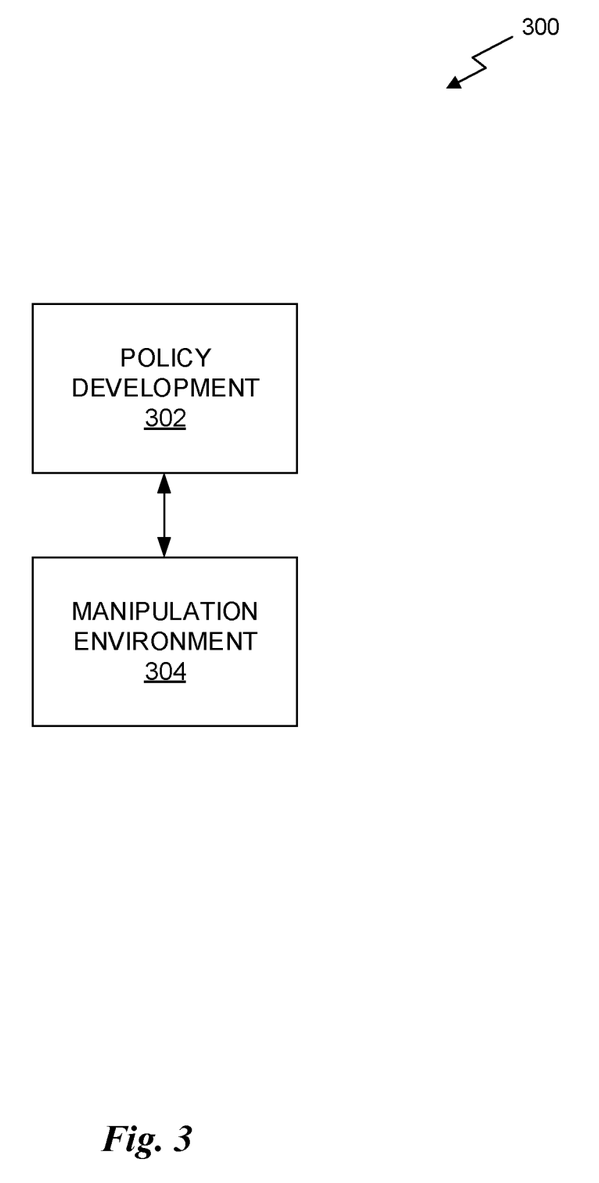
FIG. 3 illustrates an exemplary policy development and deployment environment, in accordance with an embodiment.

FIG. 3 illustrates an exemplary policy development and deployment environment 300, according to one exemplary embodiment. As shown, a policy development environment 302 may include one or more computing devices that identify a manipulation task to be completed within a manipulation environment 304, decompose the manipulation task into a plurality of policies, fine-tune each of the plurality of policies to facilitate policy chaining, and chain the fine-tuned plurality of policies.

Additionally, the chained fine-tuned plurality of policies may then be implemented within the manipulation environment 304, which may include a manufacturing environment including a plurality of robotic manipulators, a vehicle environment including a plurality of vehicle manipulation devices, or any other environment including physical manipulation entities that are responsive one or more policies.

Adversarial Skill Chaining for Long-Horizon Robot Manipulation Via Terminal State Regularization Deep reinforcement learning (RL) presents a promising framework for learning robot behaviors. However, learning a complex long-horizon task using a single control policy is challenging due to its high computational costs and the exploration burdens of RL models. A more practical solution is to decompose a whole task into smaller chunks of subtasks, learn a policy for each subtask, and sequentially execute the subtasks to accomplish the entire task.

However, naively executing one policy after another would fail when the subtask policy encounters a starting state never seen during training. In other words, a terminal state of one subtask may fall outside of the set of starting states that the next subtask policy can handle, and may thus fail to accomplish the subtask. In robot manipulation, complex interactions between a high-DoF robot and multiple objects could lead to a wide range of robot and object configurations, which may be infeasible to be covered by a single policy. Therefore, skill chaining with policies with limited capability is not trivial and requires adapting the policies to make them suitable for sequential execution.

To resolve the mismatch between the terminal state distribution (i.e. termination set) of one policy and the initial state distribution (i.e. initiation set) of the next policy, skill chaining approaches may attempt to learn to bring an agent to a suitable starting state, discover a chain of options, jointly fine-tune policies to accommodate larger initiation sets that encompass terminal states of the preceding policy, or utilize modulated skills for smooth transition between skills.

Although these approaches can widen the initiation sets to smoothly sequence several subtask policies, they may quickly become infeasible as the larger initiation set often leads to an even larger termination set, which is cascaded along the chain of policies. Instead of enlarging the initiation set to encompass a termination set modelled as a simple Gaussian distribution, the termination set may be kept small and near the initiation set of the next policy. This can prevent the termination sets from becoming too large to be covered by the subsequent policies, especially when executing a long sequence of skills; thus, fine-tuning of subtask polices may become more sample efficient. As a result, small changes in the initiation sets of subsequent policies may be sufficient to successfully execute a series of subtask policies.

To this end, an adversarial learning framework is provided that learns an initiation set discriminator to distinguish the initiation set of the policy that follows from terminal states, and uses it as a regularization for encouraging the terminal states of a policy to be near the initiation set of the next policy. With this terminal state regularization, the pretrained subtask policies are iteratively fine-tuned to solve the subtask with the new initiation set while keep the terminal states of a policy small enough to be covered by the initiation set of the subsequent policy. As a result, the model may chain a sequence of closed-loop policies to accomplish a collection of multi-stage object assembly tasks that require high-dimensional continuous control under contact-rich dynamics.

In one embodiment, an adversarial skill chaining framework may be provided with Terminal STAte Regularization, T-STAR, for learning long-horizon and hierarchical manipulation tasks. In another embodiment, the method may learn a long-horizon manipulation task (such as furniture assembly of two different types of furniture). The terminal state regularization algorithms may improve the success rate of the policy sequencing method.

In one embodiment, the problem of chaining multiple policies for long-horizon complex manipulation tasks may be addressed. Sequentially executing skills may fail when a policy encounters a starting state (i.e. a terminal state of the preceding policy) never seen during its training. The subsequent policy can learn to address these new states, but this can end up requiring even larger state distributions to be covered by the following policies. To smoothly chain multiple subtasks without requiring boundlessly large initiation sets of subtask policies, an adversarial skill chaining framework may be provided that constrains the terminal state distribution. An exemplary approach first learns each subtask using subtask rewards and demonstrations; it then adjusts the subtask policies to effectively chain them to complete the whole task via the terminal state regularization.

The learning problem may be formulated as a Markov Decision Process defined through a tuple (S, A, R, P, $p_0$, $\gamma$) for the state space S, action space A, reward function R(s; a; s'), transition distribution P(s'|s; a), initial state distribution $p_0$, and discount factor $\gamma$. A policy $\pi$: $\mathcal{S} \to \mathcal{A}$ is defined that maps from states to actions and correspondingly moves an agent to a new state according to the transition probabilities. The policy is trained to maximize the expected sum of discounted rewards:

$$\mathbb{E}_{(s,a) \sim \pi}[\Sigma_{t=0}^{T} \gamma^t R(s_t, a_t)]$$

where T is the episode horizon. Each policy comes with an initiation set $\mathcal{I} \subset \mathcal{S}$ and termination set $\beta \subset \mathcal{S}$, where the initiation set $\mathcal{I}$ contains all initial states that lead to successful execution of the policy and the termination set $\beta$ consists of all final states of successful executions. It may be assumed that the environment provides a success indicator of each subtask and this may be inferred from the final state (e.g. two parts are aligned and the connect action is activated). In addition to the reward function, it may be assumed that the learner receives a fixed set of expert demonstrations:

$$\mathcal{D}^e = \{\tau_1^e, \ldots, \tau_N^e\}$$

where a demonstration is a sequence of state-action pairs:

$$\tau_j^e = (s_0, a_0, \ldots, s_{T_j-1}, a_{T_j-1}, s_{T_j}).$$

Learning Subtask Policies

To solve a complicated long-horizon task (e.g. assembling a table), the task may be decomposed into smaller subtasks (e.g. assembling a table leg to a table top), a policy $\pi_\theta^i$ may be learned for each subtask $M_i$, and these subtask policies may be chained. Learning each subtask solely from reward signals may be challenging in robot manipulation due to a large state space of robot and objects to explore, and complex robot control and dynamics. Thus, for efficient exploration, an adversarial imitation learning approach may be used which may encourage the agent to stay near the expert trajectories using a learned reward by discerning expert and agent behaviors. Together with reinforcement learning, the policy can efficiently learn to solve the subtask even on states not covered by the demonstrations.

More specifically, each subtask policy $\pi_\theta^i$ may be trained on $R^i$ following a reward formulation which uses a weighted sum of the environment and adversarial learning rewards:

$$R^i(s_t, a_t, s_{t+1}; \phi) = \lambda_1 R_{ENV}^i(s_t, a_t, s_{t+1}) + \lambda_2 R_{GAIL}^i(s_t, a_t; \phi),$$

Where:

$$R_{GAIL}^i(s_t, a_t; \phi) = 1 - 0.25 \cdot [f_\phi^i(s_t, a_t) - 1]^2 \quad (1)$$

is the predicted reward by the adversarial learning discriminator $f_\phi^i$, and $\lambda_1$ and $\lambda_2$ are hyperparameters that balance between the reinforcement learning and adversarial imitation learning objectives. The discriminator is trained using the following objective:

$$\arg\min_{f_\phi^i} \mathbb{E}_{(s) \sim \mathcal{D}^e}[(f_\phi^i(s) - 1)^2] + \mathbb{E}_{(s) \sim \pi^i}[(f_\phi^i(s) + 1)^2]$$

Due to computational limitations, training a subtask policy for all possible initial states may be impractical, and may cause failure on states unseen during training. Instead of indefinitely increasing the initiation set, the policy may be first trained on a limited set of initial states (e.g., predefined initial states with small noise), and the policy may later be fine-tuned on the set of initial states required for skill chaining. This pretraining of subtask policies may ensure the quality of the pretrained skills and may simplify the fine-tuning stage of the method.

Policy Chaining with Terminal State Regularization

Once subtask polices are acquired, the subtask policies may be sequentially executed to complete more complex tasks. However, naively executing the polices one-by-one may fail since the policies are not trained to be smoothly connected. For example, independently trained subtask policies only work on a limited range of initial states. Therefore, the execution of a policy $\pi_i$ fails on the terminal states of the preceding policy $\beta_{i-1}$ outside of its initiation set $\mathcal{I}_i$.

For successful sequential execution of $\pi_{i-1}$ and $\pi_i$, the terminal states of the preceding policy may be included in the initiation set of the subsequent policy, $\beta_{i-1} \subset \mathcal{I}_i$. This may be achieved either by widening the initiation set of the subsequent policy or by shifting the terminal state distribution of the preceding policy. However, in robot manipulation, the set of valid terminal states may be large and may contain freely located objects (e.g., a robot may complicate a workplace by moving or throwing other parts away). This issue may be cascaded along the chain of policies, which may lead to the boundlessly large initiation set required for policies.

Therefore, a policy needs to not only increase the initiation set (e.g. assemble an object in diverse configurations) but also regularize the termination set (e.g. keep the workplace organized) to be bounded and close to the initiation set of the subsequent policies. To this end, an adversarial framework may be provided which jointly trains both an initiation set discriminator, $D_\omega^i(s_t)$, to distinguish the terminal states of the preceding policy and the initiation set of the corresponding policy, and a policy to reach the initiation set of the subsequent policy with the guidance of the initiation set discriminator. The initiation set discriminator may be trained for each policy to minimize the following objective:

$$\mathcal{L}_i(\omega) = \mathbb{E}_{s_T \sim \mathcal{I}_s}[D_\omega^i(s_T) - 1]^2 + \mathbb{E}_{\sim \beta_{i-1}}[D_\omega^i(s_T)]^2. \quad (2)$$

With the initiation set discriminator, the terminal state distribution of the policy may be regularized by encouraging the policy to reach a terminal state close to the initiation set of the following policy. The terminal state regularization can be formulated as follows:

$$R_{TSR}^i(s; \omega) = \begin{cases} D_\omega^{i+1}(s) & \text{if } s \text{ is terminal and successful} \\ 0 & \text{otherwise} \end{cases} \quad (3)$$

Then, the reward function may be rewritten with the terminal state regularization:

$$R^i(s_t, a_t, s_{t+1}; \phi, \omega) = \lambda_1 R_{ENV}^i(s_t, a_t, s_{t+1}) + \lambda_2 R_{GAIL}^i(s_t, a_t; \phi) + \lambda_3 R_{TSR}^i(s_{t+1}; \omega), \quad (4)$$

where $\lambda_3$ is a weighting factor for the terminal state regularization. The first two terms of this reward function guide a policy to accomplish the subtask while the terminal state regularization term forces the termination set to be closer to the initiation set of the following policy.

With this reward function incorporating the terminal state regularization, subtask policies and adversarial learning discriminators can be updated. Once subtask policies are updated, terminal states and initiation sets may be collected with the updated policies, and the initiation set discriminators may be trained. These procedures may be alternated to smoothly chain subtask policies, as summarized in Table 1 below.

TABLE 1

Algorithm 1 T-STAR: Skill chaining via terminal state regularization

Require: Expert demonstrations $\mathcal{D}_1^e, \ldots, \mathcal{D}_K^e$, subtask MDPs $\mathcal{M}_1, \ldots, \mathcal{M}_K$
1: Initialize subtask policies $\pi_\theta^1, \ldots, \pi_\theta^K$, GAIL discriminators $f_\phi^1, \ldots, f_\phi^K$, initiation set discriminators $D_\omega^1, \ldots, D_\omega^K$, initial state buffers $\mathcal{B}_\mathcal{I}^1, \ldots, \mathcal{B}_\mathcal{I}^K$, and terminal state buffers $\mathcal{B}_\mathcal{B}^1, \ldots, \mathcal{B}_\mathcal{B}^K$
2: for each subtask i = 1, ..., K do
3:   while until convergence of $\pi_\theta^i$ do
4:     Rollout trajectories $\tau = (s_0, a_0, r_0, \ldots, s_T)$ with $\pi_\theta^i$
5:     Update $f_\phi^i$ with $\tau$ and $\tau^e \sim \mathcal{D}_i^e$
6:     Update $\pi_\theta^i$ using $R^i(s_t, a_t, s_{t+1}; \phi)$ in Equation (1)     ▷ Train subtask policy
7:   end while
8: end for
9: for m = 0, 1, ..., M do
10:   for each subtask i = 1, ..., K do
11:     Sample $s_0$ from environment or $\mathcal{B}_\mathcal{B}^{i-1}$
12:     Rollout trajectories $\tau = (s_0, a_0, r_0, \ldots, s_T)$ with $\pi_\theta^i$
13:     if $\tau$ is successful then
14:       $\mathcal{B}_\mathcal{I}^i \leftarrow \mathcal{B}_\mathcal{I}^i \cup s_0$, $\mathcal{B}_\mathcal{B}^i \leftarrow \mathcal{B}_\mathcal{B}^i \cup s_T$   ▷ Collect initial and terminal states of successful trajectories
15:     end if
16:     Update $f_\phi^i$ with $\tau$ and $\tau^e \sim \mathcal{D}_i^e$     ▷ Fine-tune GAIL discriminator
17:     Update $\pi_\theta^i$ using $R^i(s_t, a_t, s_{t+1}; \phi, \omega)$ in Equation (4)   ▷ Fine-tune subtask policy with terminal state regularization
18:     Update $\mathcal{D}_\omega^i$ with $s_\beta \sim \mathcal{B}_\mathcal{B}^{i-1}$ and $s_I \sim \mathcal{B}_\mathcal{I}^i$   ▷ Train initiation set discriminator
19:   end for
20: end for An adversarial skill chaining framework is provided that addresses the problem of the increasing size of initiation sets required for executing a long chain of manipulation skills. To prevent excessively large initiation sets to be learned, the terminal state distribution of a subtask policy is regularized to be close to the initiation set of the following subtask policy. Through terminal state regularization, this approach jointly trains all subtask policies to ensure that the final state of one policy is an acceptable initial state for the policy that follows.

Figure 4:
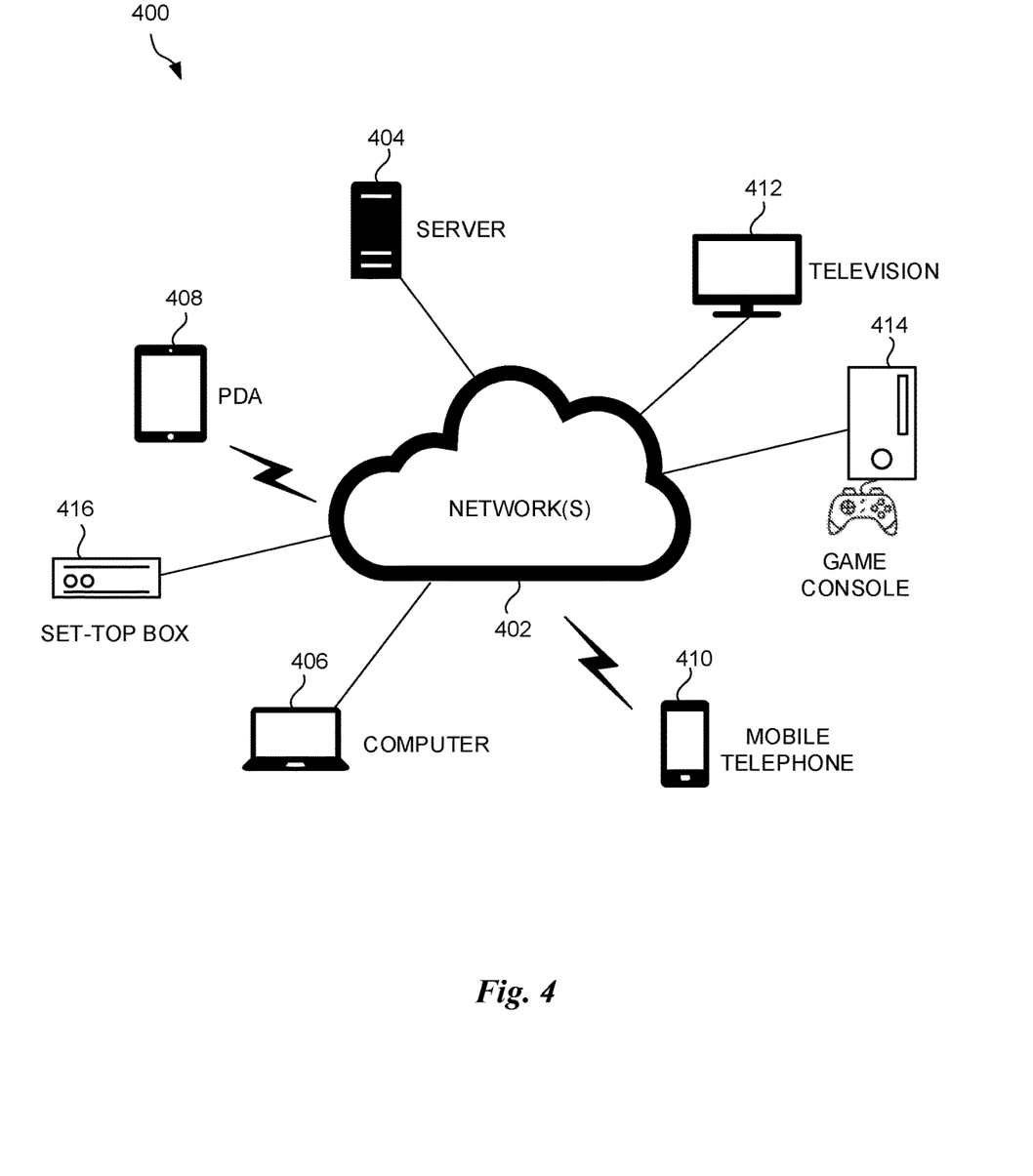
FIG. 4 illustrates a network architecture, in accordance with an embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, a game console 414, a television set-top box 416, etc.

Figure 5:
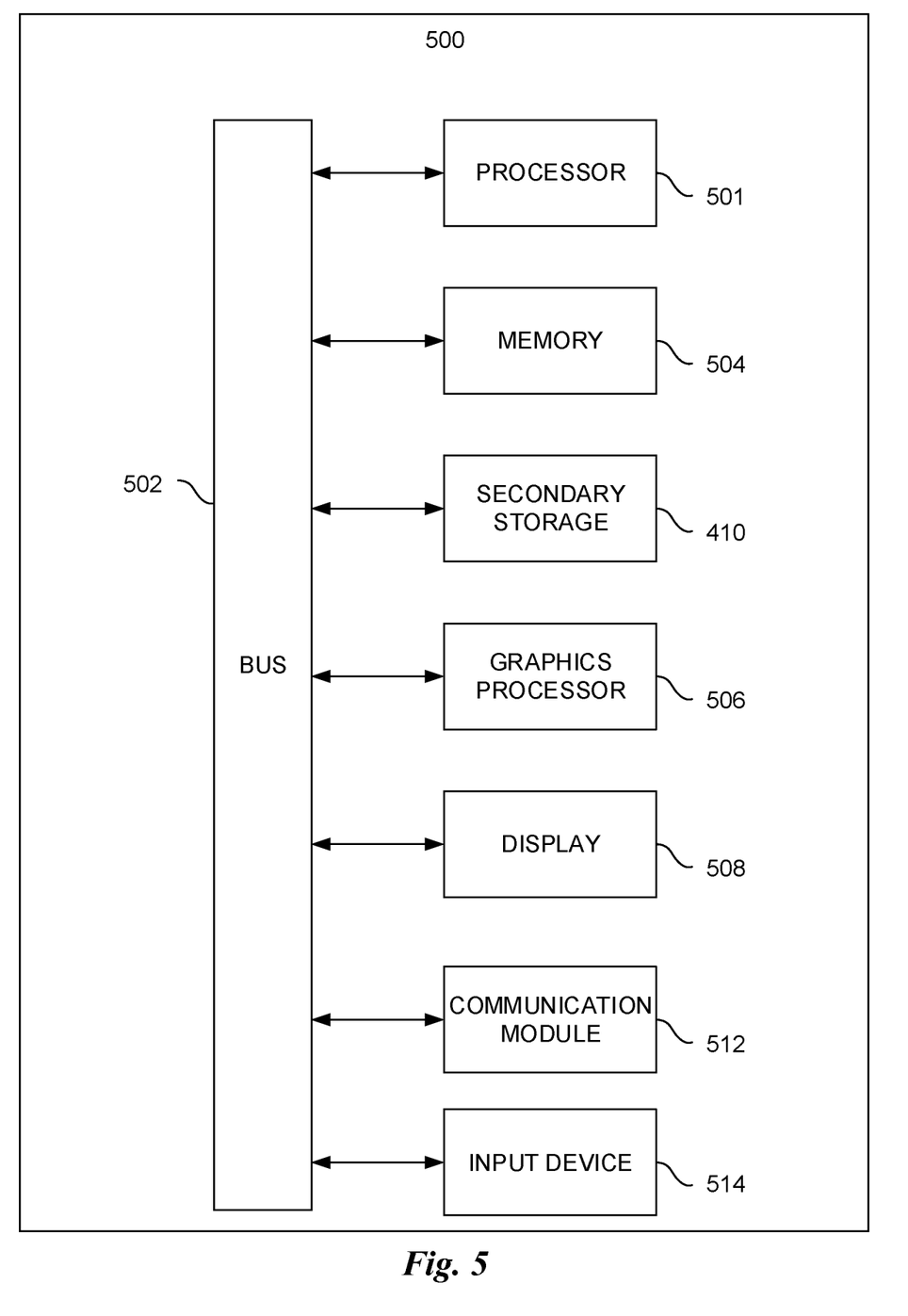
FIG. 5 illustrates an exemplary system, in accordance with an embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g., via Bluetooth, Near Field Communication (NFC), Cellular communication, etc.).

As also shown, the system 500 may include one or more input devices 514. The input devices 514 may be wired or wireless input device. In various embodiments, each input device 514 may include a keyboard, touch pad, touch screen, game controller (e.g. to a game console), remote controller (e.g. to a set-top box or television), or any other device capable of being used by a user to provide input to the system 500.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including handheld devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising, at a device:
   determining an initial state distribution of a second state-action policy, the initial state distribution including possible states of an environment immediately before the second state-action policy is implemented;
   fine-tuning a first state-action policy to match a terminal state distribution of the first state-action policy to the initial state distribution of the second state-action policy, the terminal state distribution including possible states of the environment immediately after the first state-action policy is implemented;
   implementing the fine-tuned first state-action policy and the second state-action policy in sequence, wherein a terminal state of the environment resulting from implementation of the first state-action policy is provided as an initial state of the environment to the second state-action policy.

2. The method of claim 1, wherein the first state-action policy and the second state-action policy each describes one or more manipulations performed by one or more manipulation entities on one or more objects.

3. The method of claim 2, wherein the one or more manipulation entities include one or more robotic manipulation devices.

4. The method of claim 2, wherein the one or more manipulation entities include one or more vehicle manipulation devices.

5. The method of claim 2, wherein the one or more objects include one or more components of a product being assembled.

6. The method of claim 2, wherein the one or more objects include one or more components of a vehicle being controlled.

7. The method of claim 2, wherein the initial state distribution of the second state-action policy identifies all possible states of the one or more manipulation entities and the one or more objects being manipulated immediately before the second state-action policy is implemented.

8. The method of claim 2, wherein the terminal state distribution of the first state-action policy identifies all possible states of the one or more manipulation entities and the one or more objects being manipulated immediately after the first state-action policy is implemented.

9. The method of claim 1, wherein the first state-action policy is adjusted so that the terminal state distribution of the first policy is within a predetermined threshold of the initial state distribution of the second state-action policy.

10. The method of claim 1, wherein the fine-tuning is performed within a simulation of the environment.

11. The method of claim 1, wherein the fine-tuning is performed within the environment.

12. The method of claim 1, comprising implementing the chained policies within the environment.

13. A system comprising:
    a hardware processor of a device that is configured to:
    determine an initial state distribution of a second state-action policy, the initial state distribution including possible states of an environment immediately before the second state-action policy is implemented;
    fine-tune a first state-action policy to match a terminal state distribution of the first state-action policy to the initial state distribution of the second state-action policy, the terminal state distribution including possible states of the environment immediately after the first state-action policy is implemented;
    implement the fine-tuned first state-action policy and the second state-action policy in sequence, wherein a terminal state of the environment resulting from implementation of the first state-action policy is provided as an initial state of the environment to the second state-action policy.

14. The system of claim 13, wherein the first state-action policy and the second state-action policy each describes one or more manipulations performed by one or more manipulation entities on one or more objects.

15. The system of claim 14, wherein the one or more manipulation entities include one or more robotic manipulation devices.

16. The system of claim 14, wherein the one or more manipulation entities include one or more vehicle manipulation devices.

17. The system of claim 14, wherein the one or more objects include one or more components of a product being assembled.

18. A non-transitory computer-readable storage medium storing instructions that, when executed by a processor of a device, causes the processor to cause the device to:
    determine an initial state distribution of a second state-action policy, the initial state distribution including possible states of an environment immediately before the second state-action policy is implemented;

fine-tune a first state-action policy to match a terminal state distribution of the first state-action policy to the initial state distribution of the second state-action policy, the terminal state distribution including possible states of the environment immediately after the first state-action policy is implemented;

implement the fine-tuned first state-action policy and the second state-action policy in sequence, wherein a terminal state of the environment resulting from implementation of the first state-action policy is provided as an initial state of the environment to the second state-action policy.

19. The non-transitory computer-readable medium of claim 18, wherein the first state-action policy is adjusted so that the terminal state distribution of the first policy is within a predetermined threshold of the initial state distribution of the second state-action policy.

* * * * *